(12) United States Patent
Uzo

(10) Patent No.: US 9,779,396 B2
(45) Date of Patent: Oct. 3, 2017

(54) METHOD OF MAKING MOBILE PAYMENTS TO A RECIPIENT LACKING A WIRELESS OR CONTACTLESS TERMINAL

(71) Applicant: Chijioke Chukwuemeka Uzo, Marlboro, NJ (US)

(72) Inventor: Chijioke Chukwuemeka Uzo, Marlboro, NJ (US)

( * ) Notice: Subject to any disclaimer, the term of this patent is extended or adjusted under 35 U.S.C. 154(b) by 365 days.

(21) Appl. No.: 13/864,327

(22) Filed: Apr. 17, 2013

(65) Prior Publication Data

US 2014/0052553 A1 Feb. 20, 2014

Related U.S. Application Data

(60) Provisional application No. 61/742,575, filed on Aug. 14, 2012.

(51) Int. Cl.
*G06Q 40/00* (2012.01)
*G06Q 20/20* (2012.01)
*G06Q 20/32* (2012.01)

(52) U.S. Cl.
CPC .......... *G06Q 20/204* (2013.01); *G06Q 20/20* (2013.01); *G06Q 20/322* (2013.01)

(58) Field of Classification Search
None
See application file for complete search history.

(56) References Cited

U.S. PATENT DOCUMENTS

2012/0209749 A1* 8/2012 Hammad ..................... 705/27.1
2013/0246258 A1* 9/2013 Dessert ........................... 705/41

FOREIGN PATENT DOCUMENTS

GB 201210490 A * 12/2012

* cited by examiner

*Primary Examiner* — Shay S Glass
(74) *Attorney, Agent, or Firm* — Jeffrey C. Watson; Mathew L. Grell; Grell & Watson Patent Attorneys LLC

(57) ABSTRACT

The current invention provides a mobile payment method and a number of variations that enable a consumer to pay for a purchase from a merchant. Preferably the consumer may use a mobile device such as a smart phone to complete the transaction. With the current invention, the merchant may be capable of conducting the transaction using only an ordinary point of sale (OPOS) terminal, allowing the merchant and consumer to conduct business in a more convenient manner. The variations of the core method also significantly facilitate possible payment from the consumer to the merchant, enhancing the efficiency of the transactions.

13 Claims, 9 Drawing Sheets

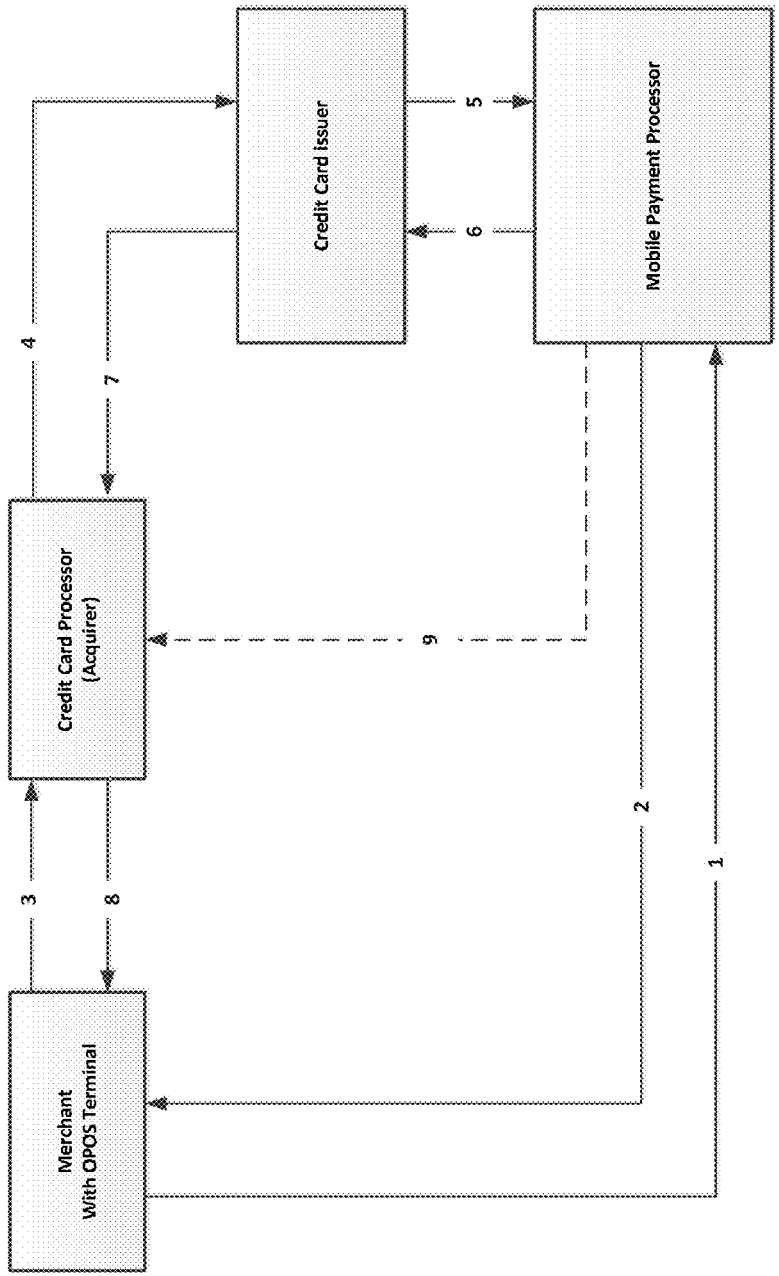
Figure 2.1

Front of Card

System number
3 = Amex
4 = Visa
5 = MasterCard
6 = Discover

Issuer ID or
Bank
Identification
Number

Account
number

Check Digit

Back of Card

Magnetic Stripe
(magstripe)

METHOD OF MAKING MOBILE PAYMENTS TO A RECIPIENT LACKING A WIRELESS OR CONTACTLESS TERMINAL

CLAIM OF PRIORITY

This is a US utility application claims priority from U.S. Provisional Application No. 61/742,575 filed on Aug. 14, 2012, the contents of which are fully incorporated herein by reference.

FIELD OF THE INVENTION

The invention relates to payment methods, and in particular to methods of making mobile payments to a recipient without a wireless or contactless point of sale terminal.

BACKGROUND OF THE INVENTION

Mobile payments refer to a method of using a cell phone or similar wireless device to make payments to a merchant or similar recipient. The payment device does not make contact with the merchant's point-of-sale (POS) terminal. These payments are described as "contactless" payments as opposed to "contact" payments where contact is made by the processing terminal with the consumer's payment instrument e.g., a credit card or smart card.

Contactless payments require that the merchant have a Special Point-of-sale (SPOS) terminal specifically fabricated to process payments wirelessly (i.e. without contact). Such SPOS terminals can wirelessly receive data that identifies the payment instrument, for example a credit card or debit card. This contactless transmission is achieved using a variety of techniques including a. Reading payment information from a near field communications chip (NFC) embedded in a credit card, debit card, cell phone, tablet, or similar device which transmits data using very short-range radio communication. The maximum range is 10 inches.
  b. Reading payment information from the consumer's payment instrument using Radio Frequency Identification (RFID). The maximum range is 3 m.
  c. Reading in payment information as bar codes from any object to which these bar codes are affixed using infra red data association transmission protocols. Transmission is by line of sight and the maximum range is 5 m.
  d. Using short range wireless protocols such as Bluetooth to transmit payment instrument data to the POS terminal. The maximum range is 30 m.

The short maximum transmission distances associated with the aforementioned methods of transmitting and payment data means that contactless payments are generally usable only for in-store purchasing.

The devices used for contactless payments need to be able to store data identifying the payment instrument, and then transmit this data to the Special Point of Sale terminal for each payment. With mobile wireless devices such as cell phones, this often requires that a Near-Field-Communication chip (NFC) be part of the cell phone hardware.

Contactless devices, including NFC-enabled mobile devices, which interact with SPOS terminals to effect payment, simply represent alternative data input systems that feed into the traditional payment processing networks. Once credit card and payment data is received by the SPOS terminal, processing is exactly as if a physical credit card is swiped through a non-wireless point of sale terminal. For example, a cell phone with an NFC chip, stores a credit card number and account data, and during payment transmits this to an SPOS terminal. The SPOS terminal in turn routes the credit card number, account information and transaction data through an Acquirer to the credit card issuer. The issuer retrieves the account associated with the credit card number, matches this with data received, approves or declines the payment transaction based on credit balance, and sends its response back to the merchant through the Acquirer.

Where payment is by "contact", a credit card is swiped and the credit card number and account information is read from the magnetic stripe of the credit card. This data is routed along with the transaction data to the issuer for processing. The difference with contactless payments is only with the input devices—cell phone with NFC chip and SPOS terminal—used to receive credit card information and transaction data. With contactless payments both the data transmitting payment device and the point of sale terminal receiving the data have to be enabled for wireless transmission. Those not so enabled have to be modified or replaced.

Although some types of mobile payments can be performed over much longer distances, they too require Special POS terminals for the merchant and the payment device has to be able to transmit payment information over longer distances.

SUMMARY OF THE INVENTION

The current invention describes a method of making mobile payments to a merchant or recipient having an ordinary point of sale terminal (OPOS) which is not enabled for wireless or contactless payments. The mobile wireless payment in this invention uses the telephone or internet network and therefore does not have distance limitations imposed by the transmission protocols of traditional contactless payments. Mobile payments need not be made in-person but can also be made remotely and in particular can be made to online merchants. Offline merchants and individuals with non-wireless point-of-sale terminals can register to accept mobile payments without modification or retooling of their existing payment terminals. Online merchants can also accept mobile payments, and do not need a physical payment terminal, but need to register with a Mobile Payment Processor.

This invention enables a mobile wireless device such as a cell phone to be used for mobile payment, over large distances, without requiring specialized hardware in the phone, such as an NFC chip or a wireless receiver on the point of sale terminal. The mobile payment device draws on funds from a Mobile Payment Account provided either by the mobile payment processor or a bank issuer. The mobile payment device can also store credit card data and use it in making mobile payments without having to modify either the cell phone or the merchant point of sale terminal. Although the invention describes processing with a non-wireless POS, It does not have the short distance limitations associated with most wireless point of sale terminals. It can therefore be used with wireless POS terminals to process long distance mobile payments.

This invention describes a method of using an ordinary point of sale terminal (OPOS) that is not enabled for contactless or wireless payments, to accept mobile payments, where mobile payments are defined as payments made from a wireless device such as a cell phone. Although mobile payments made from a transmitting wireless device such as a cell phone are "contactless" payments, they differ from traditional contactless payments which need to be close to the point of sale terminal (from a few centimeters to about 5 meters). Mobile payments as defined in this invention can be made from a device either in the proximity of the point of sale terminal or from a wireless device thousands of miles away. The distance limit is set by the network over which the mobile payment device can communicate wirelessly. For a cell phone on a data or telephone network, this is virtually unlimited.

BRIEF DESCRIPTION OF DRAWINGS

FIG. 2.1 is a block diagram outlining the process used to test for a merchant's successful Mobile Payment Processing (MPP).

DESCRIPTION OF THE PREFERRED EMBODIMENTS

Figure 1:
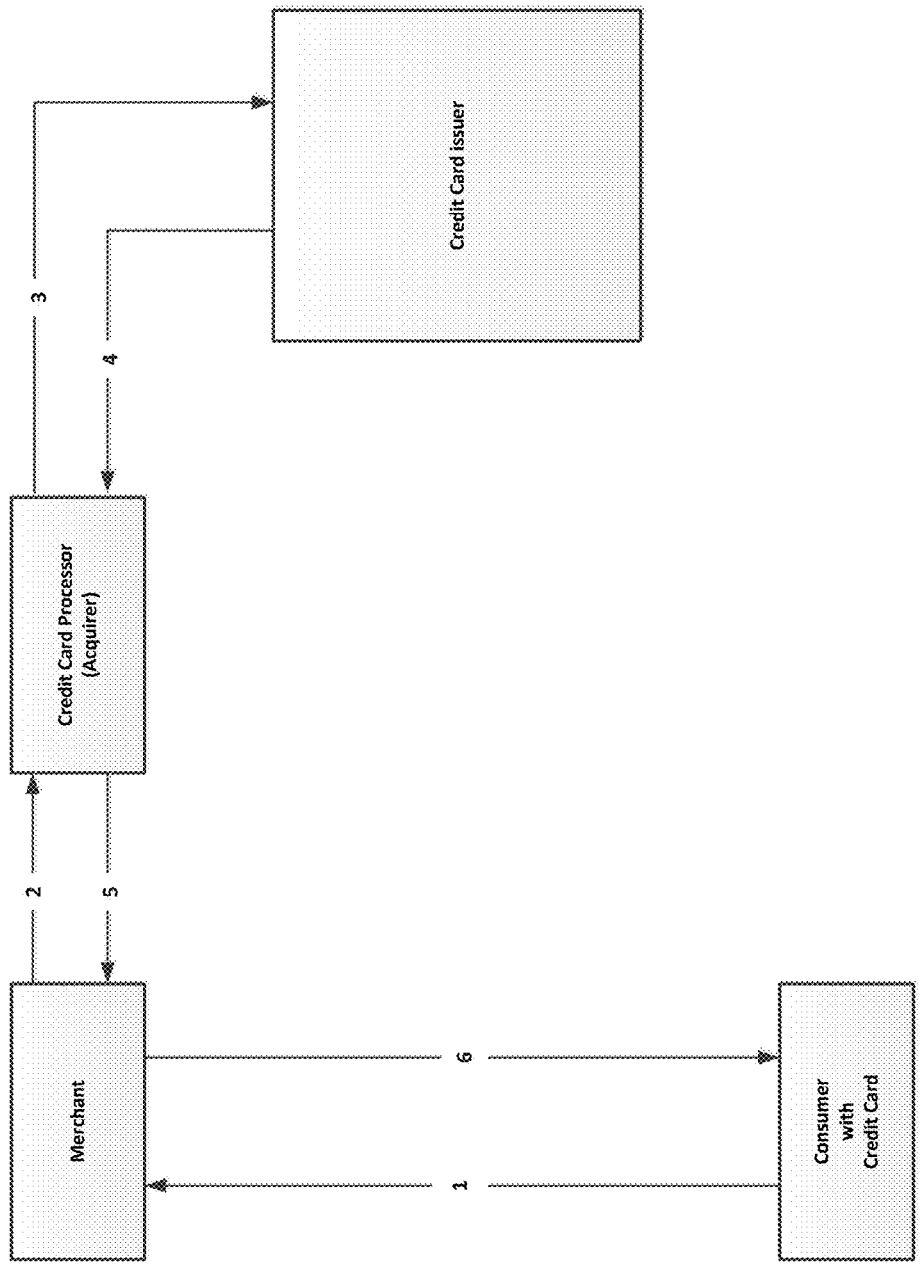
FIG. 1 is a block diagram demonstrating the flow of a purchase by consumer employing a credit card at an off-line merchant.

The preferred embodiments of the present invention will now be described with reference to the drawings. Identical elements in the various Figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Definitions and Abbreviations

Cell Phone: Used interchangeably with mobile phone or cellular phone. Communications device used to transmit and receive voice calls over a radio link and also used to transmit and receive data as text messages, email, mms, and via internet access.

Consumer: The person making a payment or purchase with a mobile device, a credit card or debit card.

Figure 5:
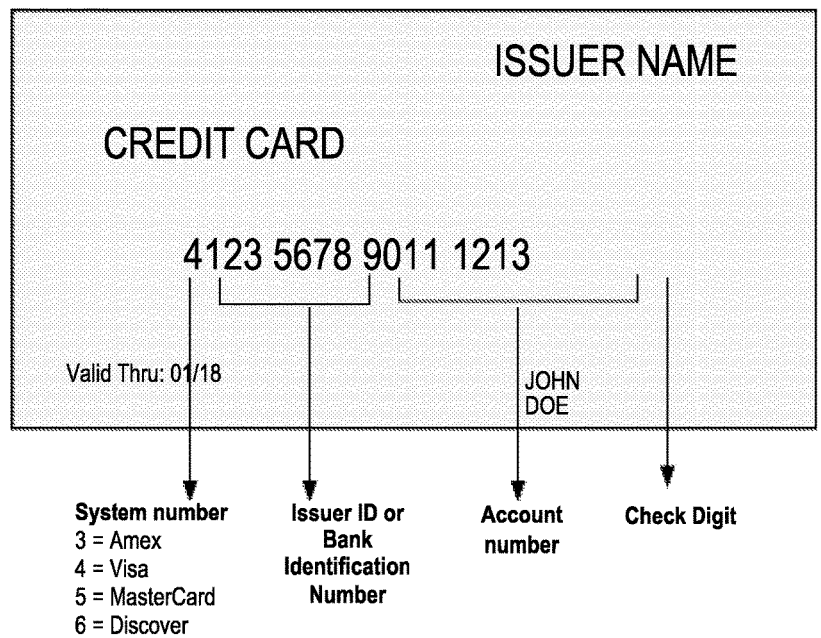
FIG. 5 is an illustration of a front view and a back view displaying the features of a typical credit/debit card.
Figure 5:
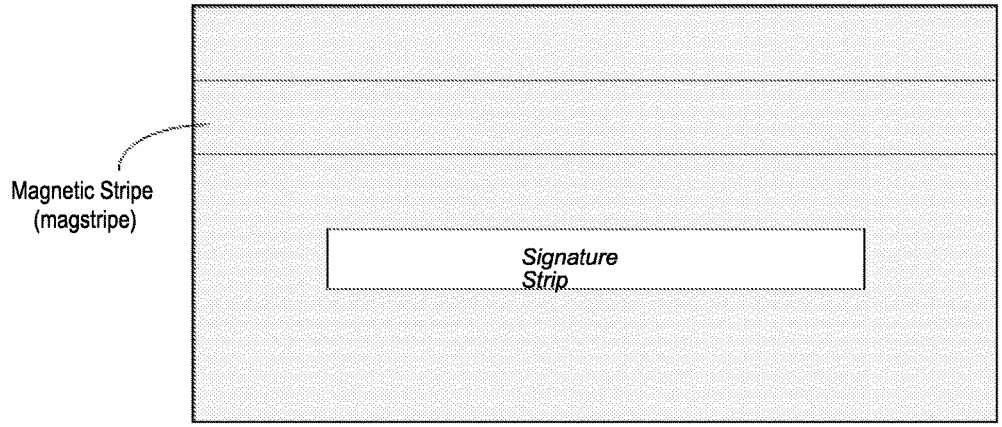

Credit Card: (See FIG. 5). The physical card with an identifying number called the credit card number which is associated with a line of credit extended to a consumer by a bank or financial institution. This number which may be 15 or 16 digits uniquely identifies the type of card, the issuing entity (usually a bank), the account number for that card within the bank, and a check digit computed from all the preceding numbers on the credit card which is used for error detection. The credit card number is also written into the magnetic stripe on the back of the card or held in memory or storage of a computer chip embedded in the card. This enables the card number to be read by appropriate point of sale devices. Because the credit card number identifies the issuer, transactions with any card can be routed to the correct issuer. Routing is performed using a stateful network protocol such as TCPIP and encryption is provided using SSL. The issuer in turn can from the card number retrieve the account number for that credit card within its own database, check the account balance, view consumer identifying information, and approve or decline a transaction. Each credit card account is stored in a relational database with the credit card number as key and all other account information as fields in the account record. Retrieval of account information is a SQL query with the credit card number as key. For example select * from credit card table where credit card number=1234 5678 9101 1216. All the account data may not reside in one table if the records are normalized in which case the select query will join all the different tables with account information each of which will have the credit card number as primary or foreign key.

Credit Card Issuer: (Issuer) This is the bank or financial institution that issues the credit card to the consumer. It creates an account representing a database record which holds the consumer's information such as name address, zip code, credit limit, payment history etc., as well as information on the credit card itself such as credit card number, account number, expiration, date of issue, expiration date, Card Verification Value (CVV).

Credit Card Verification Value (CVV). Also called the Card Security Code, is a 3 or 4 digit number written on the backs of most branded credit cards that is tied to the card number and used to prevent fraud. It is generally entered for online transactions to prove that the consumer is in physical possession of the Card. CVV is generated with algorithms known to the issuers which takes the credit card number as input. Newer algorithms have been deployed and generate verification values sometimes referred to as CVV2.

Debit Card: Debit Cards with a Visa or MasterCard logo are identical with Credit Cards. They are both issued by banks or financial institutions and follow the same policy for generating the Card number. The key differences with regards to processing are that Debit cards are backed by cash in a bank account not a credit line, and Debit Card transactions are carried on different networks from Credit Card transactions. "Debit Card" or "Credit Card" is also embossed on the physical cards to distinguish them.

Dual Tone Multi Frequency Tones: (DTMF tones). This refers to the tones used for touch stone dialing. Each number is uniquely represented by two high frequency sounds. The dual tones are generated natively by touch stone phones which include mobile phones and are traditionally used in Interactive Voice Response applications. Tones are used in this invention to send a payment instrument identification number and PIN from a mobile device to the phone number assigned to a merchant by the Mobile Payment Processor.

Interactive Voice Response Application: (IVR). This is a phone application that receives tones as input to enable navigation of a decision tree. For example, "For 'Apples' press 1. For 'Mangoes' press 2". The IVR application broadcasts a voice menu option, receives the tone sent by a phone representing a menu selection, decodes the tone to determine the number pressed, and then performs the menu action for that number. The Mobile Payment Processor uses an IVR application installed on the phone numbers assigned to merchants, to receive data. The data is consumer authentication and transaction reference information which is sent as tones from the consumer's mobile phone. Although mobile phones can generate tones natively when entered manually, the Mobile Payment Application (MoPA) installed on the consumer's phone automates tone transmission using an encoder and can send up to 40 characters per second as tones.

Magnetic Stripe: (Magstripe). This is the magnetic stripe on the back of a credit card or debit card that holds the card number, and consumer data. It has 3 tracks some of which is writeable. The information written on the magstripe varies by issuer.

Merchant: Entity that receives payment for a product or service. May be offline, that is in a physical store or online, that is on a network such as the internet.

Merchant Revenue Account: Merchant Account at the Mobile Payment Processor which is credited for each Mobile Payment. Payments received are credited to the particular POS terminal where the payment is received along with the number or identifier for the mobile device and the date and time of each transaction.

Mobile Payment: Using a cell phone or mobile wireless device such as a tablet, or laptop to make a payment. "Cell phone" will be used hereinafter as representing all such wireless devices with which a mobile payment can be made.

Mobile Payment Account: This is the account opened by the consumer, bearing cash and accessed by the Mobile Payment Processor in authorizing payment. It is the account debited for each mobile payment and credited each time the consumer loads the account either by paying cash or transferring funds from a bank account. The Mobile Payment Account therefore resembles a bank account and may in fact be a bank account if the Mobile Payment Processor is also a bank.

Mobile Payment Application: (MoPA). This is the application client downloaded on to the consumer's mobile device. It connects to the IP address or phone number or short name assigned to the merchant by the Mobile Payment Processor. It sends PIN and mobile payment device information to the merchant's assigned phone number using DTMF tones, or to the merchant's IP address by a network protocol such as https. When using a merchant's short name for payment, the mobile application first contacts the Mobile Payment Processor via a wireless protocol such as WAP to get the IP address or phone number associated with that short name and then connects directly either to the IP address via the cellular data network or to the phone number via the phone network to send the payment information. In other words, the mobile application first resolves the short name to its IP address and phone number and then connects to one of the two. The Mobile Payment Provider has a database table that maps the merchant's short name to its IP address and phone number. The Mobile Payment Application may also connect to the MPP and send the short name along with payment data directly to the MPP.

Mobile Payment Device: This is a device enabled for wireless communication which is used to make payment. Examples of such devices are cell phones (also called mobile phones), tablets, laptops, personal device assistants etc. Each such device will need to have memory that will hold the Mobile Payment Application and have an input interface for making entries or initiating transactions, and an antenna for transmitting data. "Cell phone" is used in this invention as a representative embodiment of all such wireless payment devices.

Mobile Payment Processor: (MPP). This is the entity primarily responsible for processing the mobile payment. The MPP is responsible for registering the merchant and assigning a payment ID to the merchant in the form of an IP address, a phone number and a short name either of which is used by the consumer in making a mobile payment to the merchant. One of the Merchant IDs is what the mobile device connects to wirelessly in order to make payment. The MPP ensures that the consumer's wireless payment device is "loaded" which means it is linked either to cash or to a payment instrument such as a credit card or debit card or to both. The MPP also provides the mobile payment application which is installed on the consumer's mobile phone and used to make mobile payments. The application is network-aware and sends information either via the data network or via the phone network.

Mobile Payment Processor Clearing Server: (MPPCS). The server at the MPP that manages the database with consumer and merchant information. It is the MPP computer which the consumer, the merchant and the issuer each connect to in interacting with the MPP. It has a public key used for SSL and https connections with client applications on the consumer's mobile device, an online merchant's computer and the issuer's computer. In addition to maintaining records and accounts of all its mobile payment transacting parties, the MMPCS also acts like a telephone public branch exchange (PBX) and assigns a phone number, IP address, and short name to each merchant who wants to accept mobile payments. The IP address and phone number though assigned to merchant will reside at the Mobile Payment Processor and be managed by the MPPCS server. This may be provided using an Asterisk server. MPP is used in place of MPPCS where connection details to the MPP are not provided.

Ordinary POS Terminal: (OPOS). A non-wireless terminal designed to process credit card, and possibly debit card transactions, but not mobile or contactless payment transactions. It cannot receive information wirelessly from a transmitting device, nor can it read a payment device without contact. An OPOS terminal needs contact with the credit card, debit card or similar payment instrument, in order to read in the payment instrument number and account data. It then forwards this along with item price and related transaction data to the instrument Issuer for approval.

POS Terminal: Point of Sale Terminal. It is the terminal at the merchant used to process transactions. This is the terminal at which the consumer swipes or taps a credit card or debit card to make payment. It is often attached to or integrated with a cash register so that the price of the item being purchased is captured automatically and sent along with the payment instrument information to the issuer. The terminal prints a receipt on payment and for credit card transactions also prints a confirmation receipt to be signed by the consumer. Debit card transactions require that the consumer enter a PIN so the POS terminal will also have a PIN pad.

PIN: Personal Identification Number. This is a number entered by a consumer as a means of authentication. It is often used for several types of payment transactions e.g., ATM withdrawal, debit card PIN purchase, etc.

Special POS Terminal: (SPOS). A point of sale terminal specially designed to process contactless payment transactions. It can receive information wirelessly from a transmitting payment device. In this invention, the SPOS terminal is defined as one that can receive and process payment information transmitted from a cell phone or similar wireless device and can support remote payments over large distances. To do so, the SPOS terminal has a public routable IP address, a phone number connected to a phone network. It is therefore visible from the internet and can be called with a phone. From the internet, only specific ports such as port 443 are available for communication, while on the phone network a modified IVR application receives payment data as tones. Payment transactions can be performed on an SPOS terminal with any cell phone or wireless device that can connect to it. The SPOS terminal does not have distance limitations since payment devices connect to it wireless through either the phone or cellular data networks.

Descriptions

Credit Card Transaction

Before describing this invention, we begin first by describing a credit card purchase made by a consumer at an offline merchant (i.e. a brick-and-mortar merchant). Such an offline credit card transaction typically requires 4 parties as shown in FIG. 1.

1. The Consumer with a Credit Card making the purchase with a credit card. The credit card is issued to this consumer by a bank issuer or financial institution and is backed by a credit line.
2. The offline Merchant i.e., the brick-and-mortar merchant who already accepts credit card payments. He will have an ordinary point of sale terminal (OPOS) which reads the information on the credit card including the credit card number. This information is forwarded from the OPOS terminal to a credit card processor or Acquirer from where it is routed to the issuing bank. The issuing bank then retrieves the customer account associated with that credit card and decides based on the funds or credit available in the account, whether to approve or decline the transaction. Although mobile payment processing can also be performed by contactless point of sale terminals over very short distances, such terminals for the purpose of this inventions are also considered wireless or ordinary point of sale terminals.
3. The Acquirer or Credit Card Processor who provides gateway and processing services to the merchant. Gateway services refer to routing of payment authorization requests for a credit card purchase from the merchant to the issuer of that credit card. It also includes settling the transactions by crediting the merchant's account for the approved transaction amount less any fees. The fees, which are usually between 2% and 5% are split between the Acquirer and the issuing bank. There may be more than one Acquirer in the transaction path from merchant's POS terminal to credit card issuer. Some brands of credit cards may not have Acquirers and for such cards, merchant payment requests are routed from the merchant's POS terminal directly to the credit card issuer.
4. The Credit Card Issuer. This is usually a bank or financial institution who issues the credit card (or debit card) to the consumer. The issuer is frequently referred to as the "issuing bank" although it need not be a bank, but could be a credit union, or even a non-financial institution such as a network provider. The issuer has an identifying number contained within the credit card number. This unique number which identifies the issuer is referred to as the Bank Identification Number (BIN) or the Institution Identification Number (IIN). The BIN is used by the Acquirer to identify the issuer of the credit card and so route the authorization request from the merchant to the credit card issuer. The issuer is not limited to issuing credit cards but can issue any credit instrument with a unique identifying number attached to an account from which payment is made. Banks generally issue debit cards backed by a checking account which can be used as credit cards.

For a credit card purchase at an offline merchant, the processes described below occur and follow the numbering in FIG. 1.

1. The consumer chooses to make a purchase by credit card. He swipes his credit card at the merchant's ordinary point of sale terminal (OPOS terminal) after the merchant rings up the purchase amount. For most ordinary point of sale terminals
   a. The purchase amount is shown on the terminal display and the consumer is asked to confirm the amount. The consumer may also be asked to select a cash amount to withdraw. This cash amount is added to the item price to get a total for which approval is requested.
   b. On some terminals the consumer is not asked to confirm the purchase amount once the card is swiped. However the purchase amount is displayed so the consumer may refuse to proceed with swiping his credit card.
2. The total amount for the transaction, which includes any cash withdrawal, along with the credit card number, the merchant ID, the POS Terminal ID, the item reference number, the item price are transmitted to the Acquirer (i.e. The Credit Card Processor). Acquirers provide credit card processing services to merchants. They often lease to the merchant the OPOS terminal for processing credit card payments and charge a transaction fee as well as a monthly fee.
3. The Acquirer identifies the credit card issuer from the Bank Identification number (BIN) within the credit card number and routes the transaction to this issuer. (See FIG. 5 for the parts of the credit card number that identify the bank issuer.)
4. The issuer receives from the Acquirer, the credit card number, merchant ID, merchant POS ID, transaction amount, item reference number, item price, Acquirer ID, date and time. From the credit card number, the issuer extracts the account number, retrieves that account information and matches it with the credit card information received from the merchant. It then determines if the balance on the account covers the payment and if the account is in good standing. If both conditions are met, the payment is approved, and approval notice is sent back to the merchant via the Acquirer.
5. The Acquirer sends the approval notice with approval number back to the merchant.
6. The Merchant then releases the item or service purchased to the consumer. Settlement, or credit to the merchant's account for that transaction is not immediate. Instead all the transactions processed are periodically reconciled, between the credit card issuer, acquirer and merchant, usually at close of business. The merchant's account at the acquirer is credited with his sales revenue less fees. The fees are split between the acquirer and the issuer. So although purchase confirmation is in real time, settlement or credits to the accounts of the payment parties is not.

Mobile Purchasing Through an Ordinary Point of Sale Terminal

Mobile payments refer to the process of making payments by a consumer to a merchant using a cell phone or a similar wireless transmitting device. The following parties are involved in a mobile payment transaction:

1. The consumer paying by cell phone
2. The merchant to whom payment is being made by cell phone
3. The bank Issuer or financial institution who issues the credit card which the merchant swipes at his terminal for each mobile transaction. The card number may also be held in memory on the POS Terminal and sent to the Acquire as if it was swiped by hitting key strokes.
4. The Mobile Payment Provider (MPP) who processes the mobile payment. The merchant first registers with the MPP in order to be able to process mobile payments. The merchant receives a credit card from the MPP which is swiped at its terminal for each mobile payment. The consumer also opens an account at the MPP funded with cash and linked to his cell phone. This account, called the Mobile Payment Account, resides with the Mobile Payment Provider, and is the account debited for each mobile payment or credited each time the consumer "reloads" his cell phone with cash. Although this invention describes the credit card Issuer and the Mobile Payment Provider as separate, they can be one entity. The Mobile Payment Provide can have his own BIN number and issue his own credit cards. In that case credit card transactions are routed directly to the Mobile Payment Provider by the Acquirer.

A description of how to accept mobile payments with a non-wireless POS terminal (i.e., ordinary POS terminal) is given below. Detailed pre-transaction requirements for participants in the mobile payment transaction—the consumer, merchant, acquirer, credit card issuer, and Mobile Payment Processor—are later provided. Following that, additional processing details for how to make mobile payments at an OPOS terminal are given and other embodiments of the invention are described. Specifically:

a. Making mobile payments online, for example to an internet merchant without a special point of sale terminal.

b. Making mobile payments to a merchant where the phone is loaded with data for a payment instrument such as a credit card or debit card. In this case, funds for each mobile payment come from the credit card or debit card and not from a Mobile Payment Account at the Mobile Payment Processor.

c. Making mobile payments and mobile withdrawals from wireless point of sale terminals and wireless ATMs.

Connection between MoPA and the MPP as well as between the MPP and the Bank Issuer, require authentication and are described in detail below. The database tables and records for registering a merchant and for creating a Mobile Payment Account linked to a specific mobile phone are also described in detail in the section titled "Technical Implementation Details".

Pre-Transaction Requirements for Parties to a Mobile Payment

Just as a consumer must first be approved for and obtain a credit card before they can perform a credit card purchase, the parties to a mobile payment transaction namely the Mobile Payment Provider, the merchant and the consumer need to set up arrangements that precede mobile payment processing. This is summarized in FIG. 2 and described in detail below.

Pre-transaction Requirements—Mobile Payment Processor and Credit Card Issuer

Figure 6:
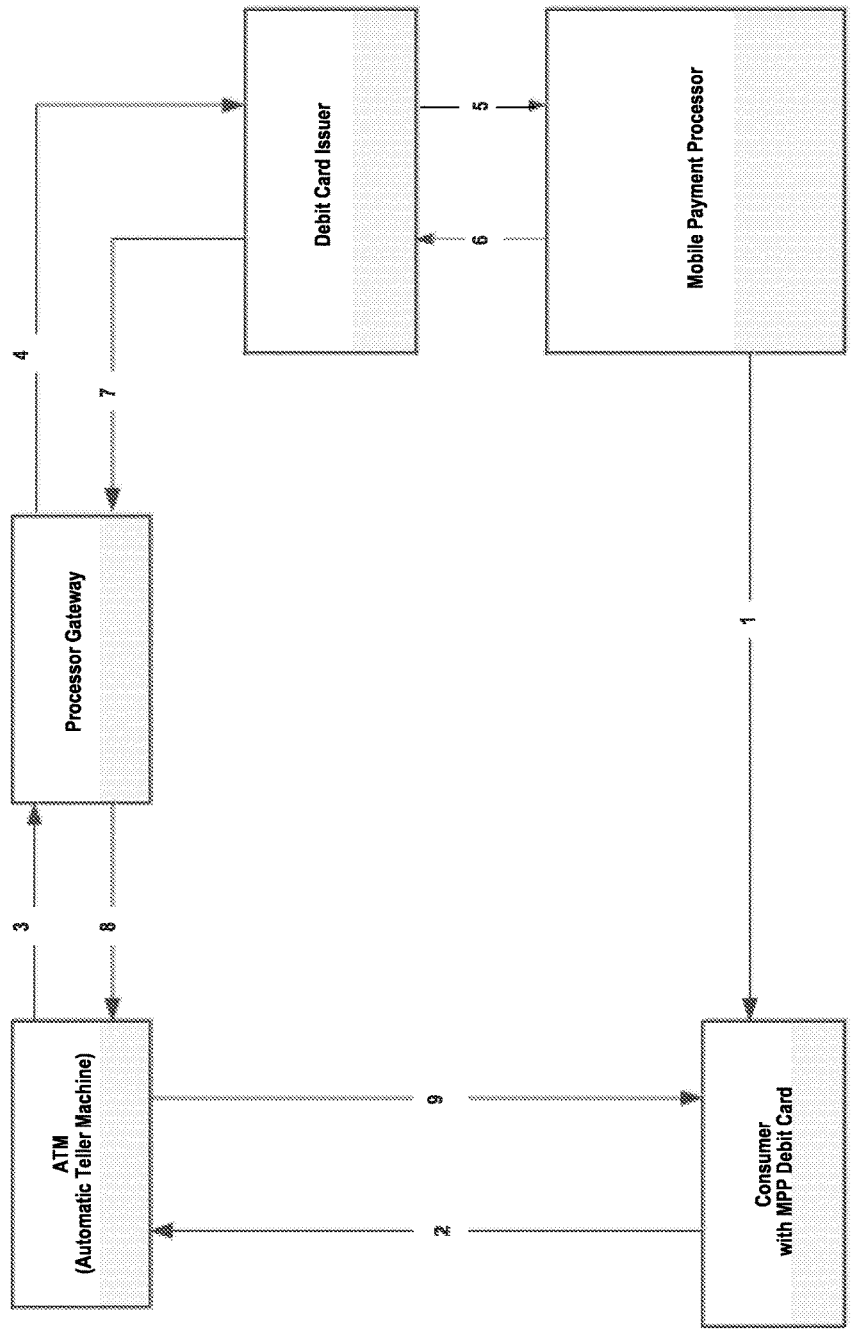
FIG. 6 is a block diagram illustrating the process for a consumer to draw cash from an automated teller machine (ATM) using a debit card linked to their mobile payment processing (MPP) account.
Figure 7:
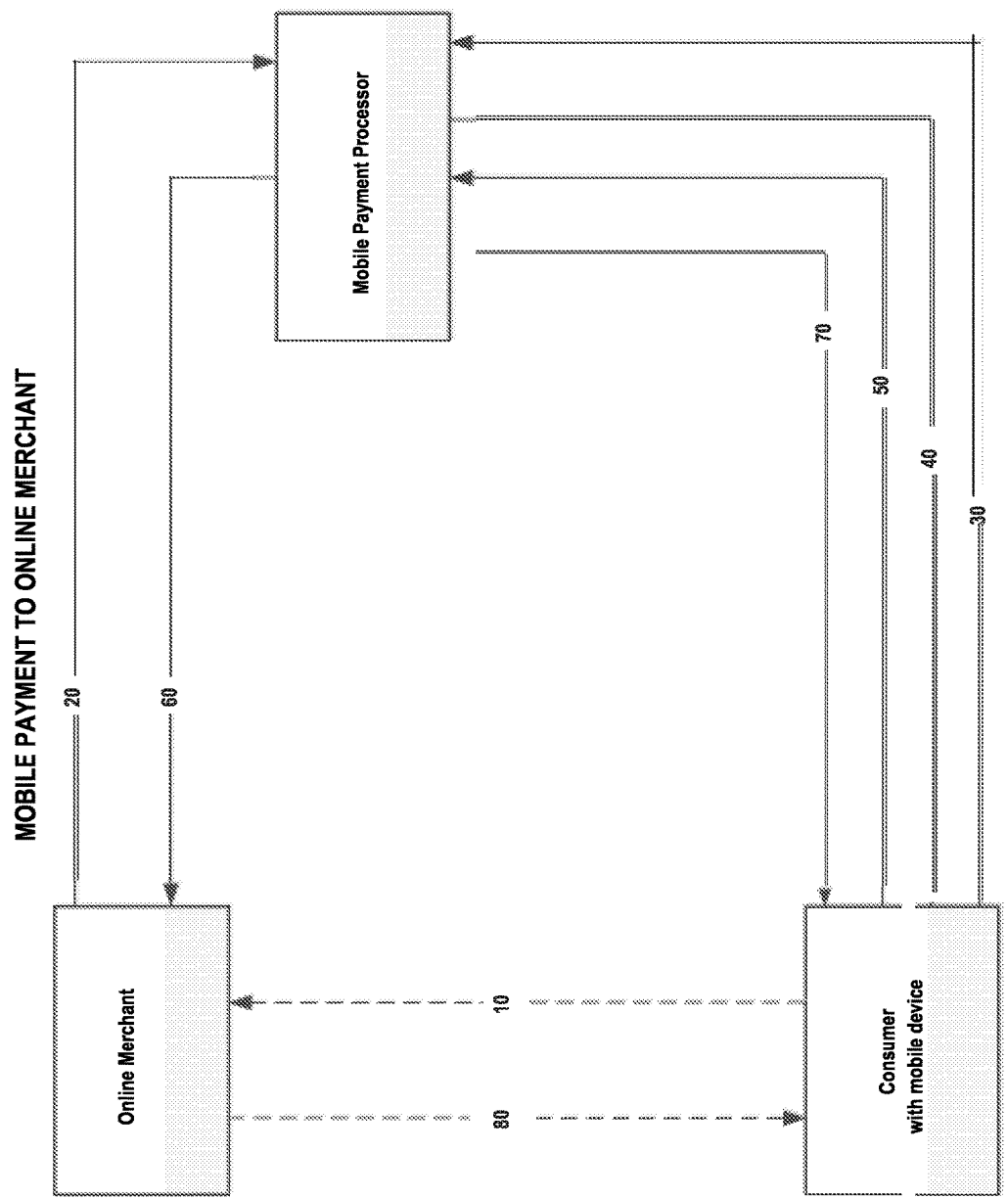
FIG. 7 is a block diagram showing the steps necessary for a merchant to be permitted to accept mobile consumer payments online.

100. The Mobile Payment Provider (MPP) needs a relationship with a credit card issuer in order to process mobile payments made at an Ordinary POS terminal (OPOS terminal). The issuer allocates a block of credit card accounts to the MPP. (FIG. 6 shows that 8 digits are available to each issuer for account numbers meaning each issuer can have ninety nine million credit card accounts). The Mobile Payment Provider needs only one credit card account for each OPOS terminal at each merchant that will accept mobile payments. The Mobile Payment Processor may circumvent the need for a relationship with a credit card issuer by obtaining a bank identification number and issuing its own credit cards. In that case, merchant authorization requests will be routed directly to it from any Acquirer.

102. Any transactions with the block of numbers assigned by the Issuer to the MPP will still be routed to the issuer as those numbers have the issuer's Bank Identification Number (See FIG. 5). When it receives such transactions the issuer will query the MPP to obtain the account information and balance on the account. It will then approve or decline the transaction as usual and forward the result to the acquirer. There is no change either to the parties or to the processing path already established by the merchant for processing credit card transactions.

104. The MPP assigns a credit card number to each OPOS terminal of a merchant that wishes to process mobile payments. This credit card is delivered to the merchant and is swiped by the merchant each time a consumer opts to make a mobile payment. The consumer's mobile payment is processed exactly like a regular credit card purchase with the difference that the merchant instead of the consumer swipes the card, while the consumer make the mobile payment with his cell phone or wireless device.

106. The MPP determines based on type of POS terminal used by the merchant whether to mail a credit card to the merchant, provide software to be loaded on the terminal, or to update the merchant's OPOS terminal firmware. The merchant's POS terminal type is provided to the MPP during merchant registration.

208. Where the merchant's POS terminal firmware can be upgraded. The MPP downloads an executable program to the POS which contains the credit card number which the MPP assigned to the merchant. Most POS terminals have memory locations where a compiled or interpreted program can be downloaded and stored. The program can then be accessed and run with specific key strokes. For example, VeriFone point of sale terminals support interpreted programs such as TCL, loaded into specific memory locations for performing a variety of tasks. For such POS terminals there will be no need to swipe a credit card for each mobile payment transaction, the merchant uses the key strokes to run the program which sends the credit number with payment request data to the Acquirer as if an actual credit card with that number had been swiped at the OPOS terminal.

Figure 3:
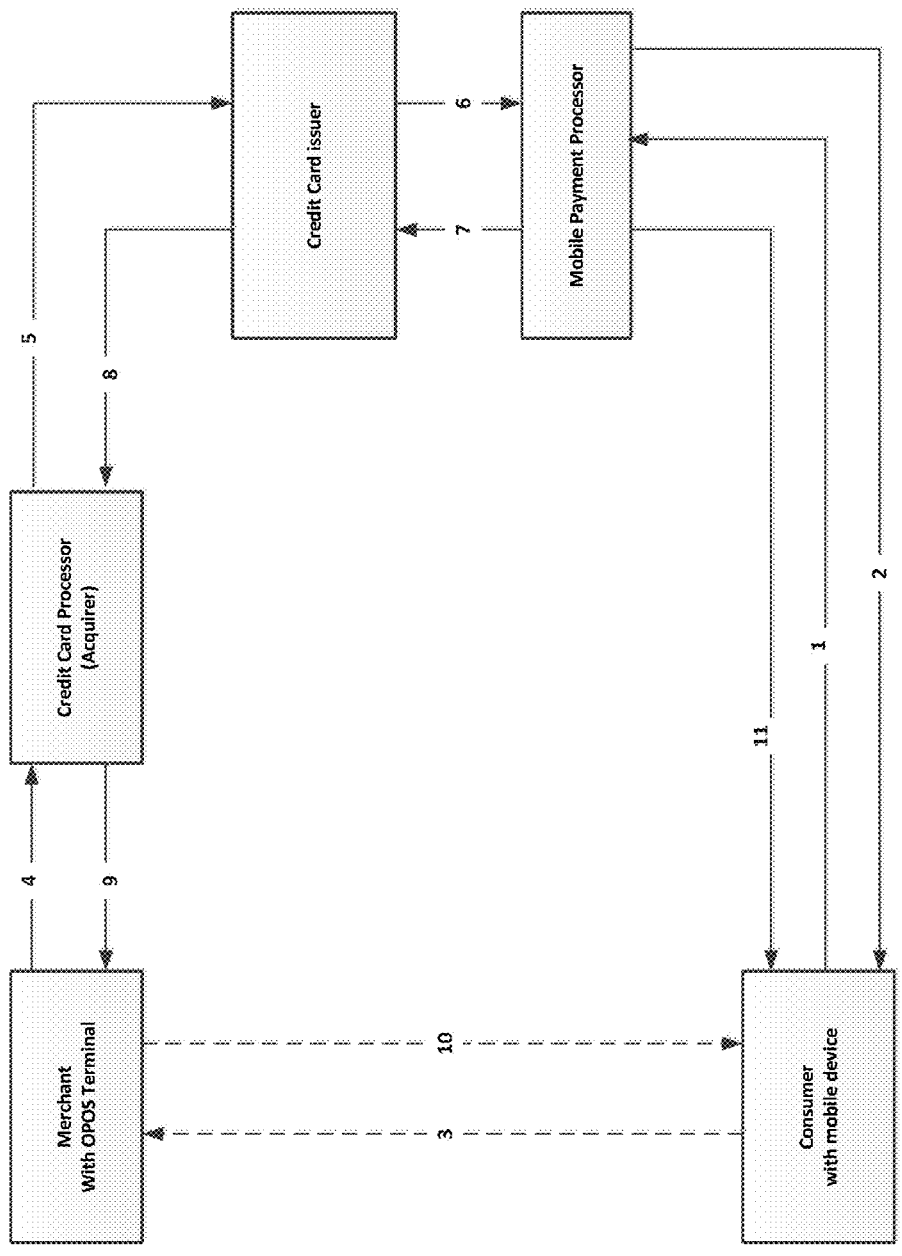
FIG. 3 is a block diagram demonstrating the merchant confirmation process when a consumer attempts to make a mobile payment at an off-line merchant.
Figure 4:
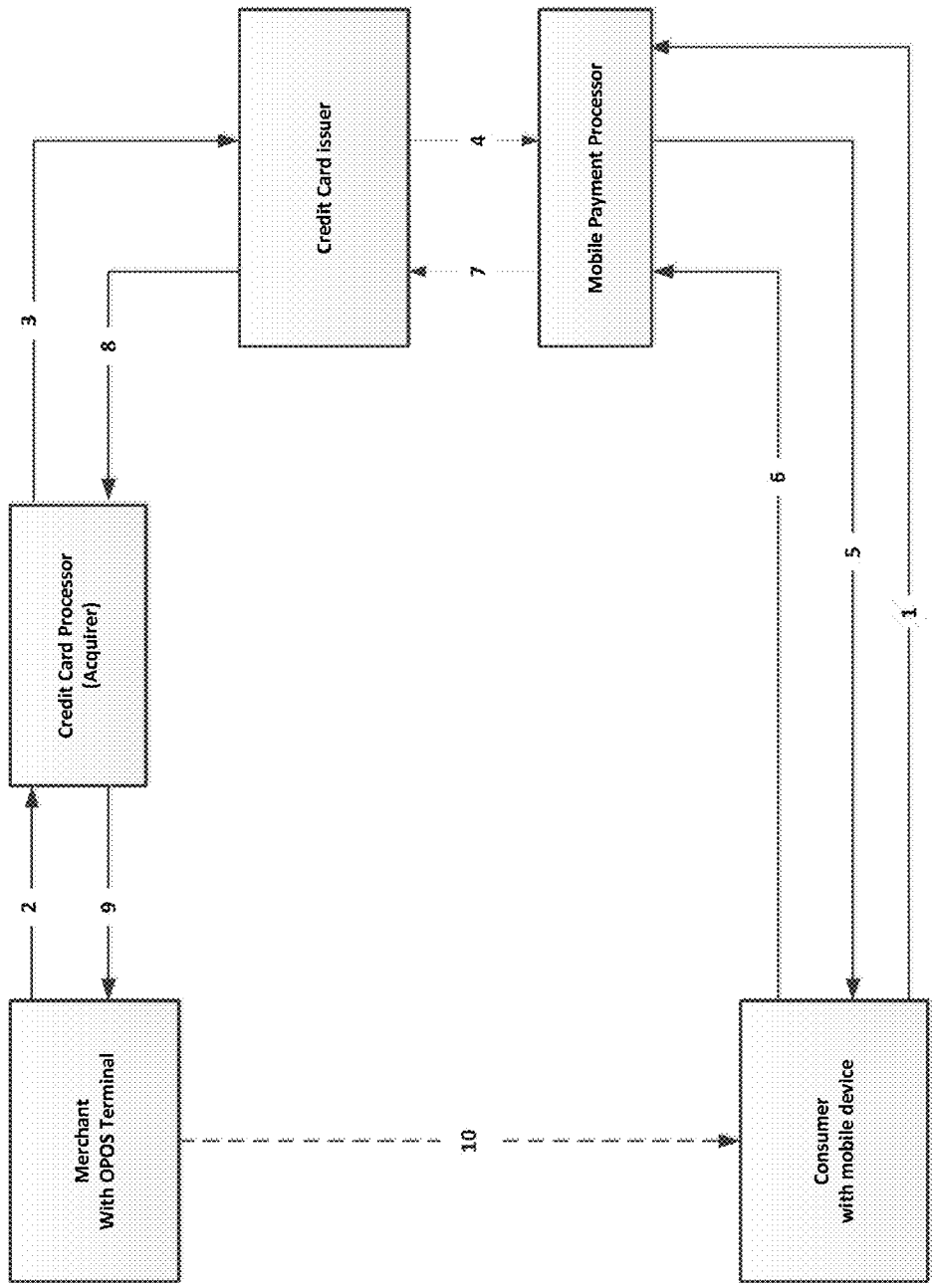
FIG. 4 is a block diagram demonstrating the consumer confirmation process for making a mobile payment at an off-line merchant.

210. If the merchant's POS terminal cannot load a program to automate sending the particular card number for each mobile transaction, then the merchant is mailed a physical credit card. This credit card number comes from the block allocated to the MPP by the credit card issuer. The merchant swipes this card each time a consumer opts to make a mobile payment, while the consumer uses his phone to connect to one of the Merchant Mobile Payment IDs assigned to the Merchant. The credit card data is routed through the Acquirer to the Credit Card Issuer and then to the MPP, while the consumer's mobile payment data is sent directly to the Merchant's Mobile Payment ID residing with the MPP. The MPP therefore receives information both from the merchant via the credit card issuer and from the consumer through his mobile device. The MPP matches the transactions to confirm payment is going to the intended merchant, and retrieves the Mobile Payment Account balance, approves or declines the transaction and sends this approval message with approval number to the issuer. The bank issuer then forwards the approval back to the merchant through the acquirer. FIG. 3 shows the processes for this invention which are described in detail below.

108. The MPP assigns a credit card to each merchant who wishes to accept mobile payments with an OPOS terminal. For each transaction at a terminal, the credit card for that terminal is transmitted manually, by being swiped, or automatically, through a loaded program on the merchant's OPOS terminal.

Merchant with OPOS Terminal—Pre-transaction Requirements

Figure 2:
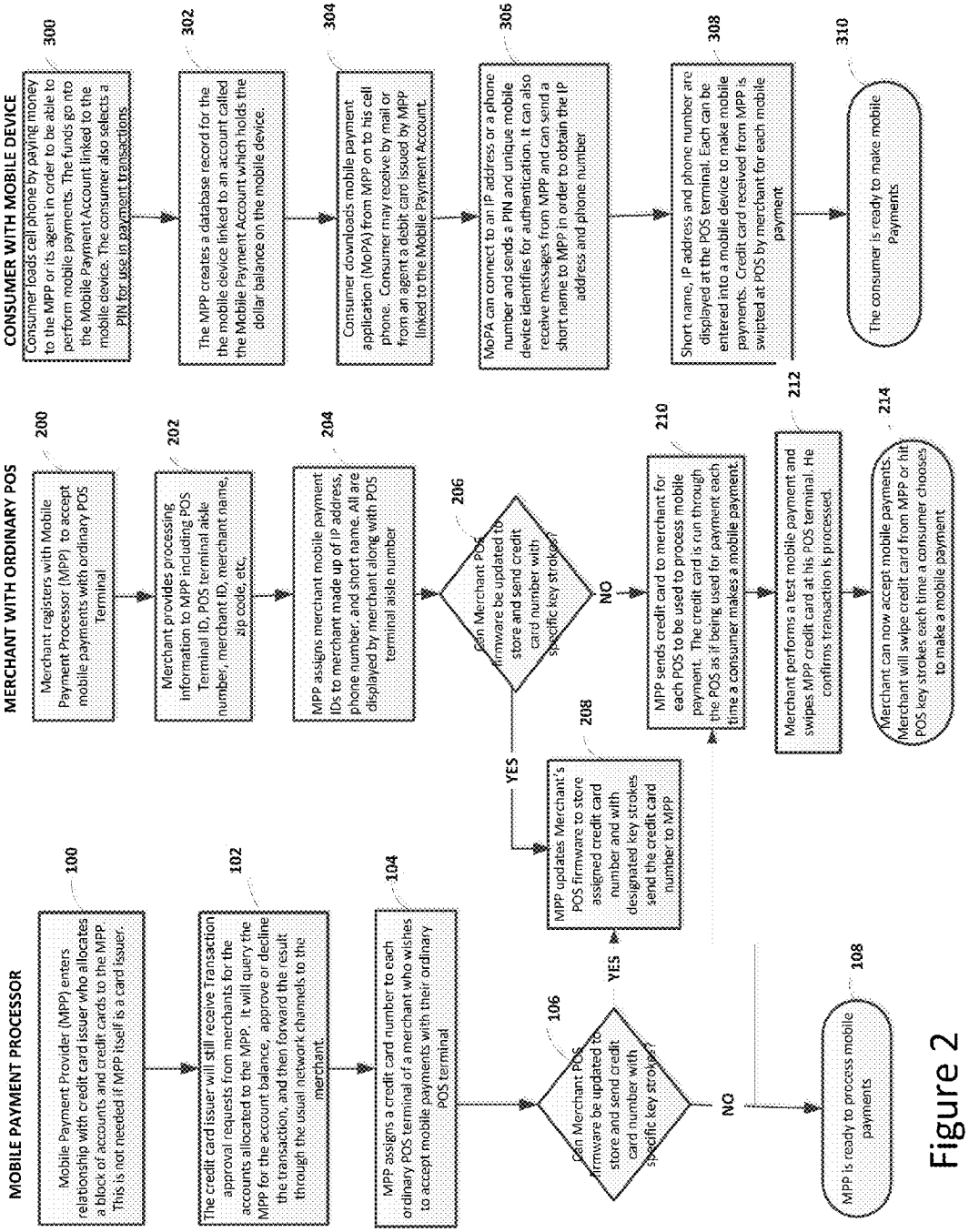
FIG. 2 is a block diagram illustrating the process of a consumer making a payment to a merchant using a wireless device.

This is summarized in FIG. 2 and described in detail below.

200. The merchant must first register with the Mobile Payment Provider to accept mobile payments.

202. The Merchant provides to the MPP during registration general information such as name, address, state, zip code, business type, SIC code, executive names, contact information etc., as well as specific information required for mobile payment processing namely:
   a. The merchant ID assigned to the merchant by the acquirer,
   b. the POS terminal ID
   c. the POS terminal type
   d. Preferred merchant short name.
   All the information provided by the merchant during registration is held as a record in the database of the MPP managed by the MPP Clearing Server (MPCS).

204. The MPP then assigns 3 identifiers to the merchant which make up the Merchant Mobile Processing Identifiers (MMPIDs). These IDs consist of:
   a. An IP address. The consumer connects to this IP address with his mobile phone, via a network protocol such as "https" (secure hypertext transfer protocol) and submits his PIN, OPOS terminal aisle number, (or item reference number) and mobile device identifiers to make a payment.
   b. A phone number. The consumer connects to this phone number if the IP address cannot be reached and submits his PIN, OPOS terminal aisle number (or item reference number), and mobile device identifier to make a payment.
   c. A short name. This is a contraction of the merchant's full name which the consumer can use in place of an IP address or phone number to make a payment. It is provided by the merchant or by the MPP. In an illustrative embodiment of this invention, a table within MPP Clearing Server Database has the merchant's assigned IP address as primary key and the phone number, short name, merchant full name, and merchant ID assigned by Acquirer as fields. So if the consumer submits a short name along with payment information to the MPP or connects to an IP address or phone number to submit payment information, the MPP can immediately determine from its database records to which merchant payment is being made.

The short name because it is easier for consumers to remember than IP addresses or phone numbers, functions just like domain names in the Domain Name System (DNS): It enables consumers to enter a name instead of numbers to make a mobile payment. The IP address, phone number and short name are called the Merchants Mobile Payment identifiers (MMPIDs). Either of them can be used to make mobile payments. During registration, the merchant gives the MPP the OPOS terminal ID for each terminal from which mobile payments will be received. It also provides an OPOS terminal reference such as an aisle number which is used by the consumer for mobile payments.

206. During registration the merchant lists each aisle from which mobile payments will be received as well as POS terminal type and POS terminal ID for that aisle. From the terminal type, the MPP determines if the POS terminal can be programmed to transmit the credit card number assigned to that OPOS terminal by hitting one or more key strokes or if a physical credit card needs to be sent to the merchant which will be swiped for each mobile payment while the consumer makes payment with his mobile phone.

208. If the POS terminal can be programmed either through a firmware upgrade or by downloading file into available memory locations which is run by key strokes, then the MPP performs the download or the upgrade. For each mobile transaction the MPP will hit the designated key strokes to send the credit card number assigned to that POS terminal by the MPP to the Acquirer. It would therefore resemble an ordinary credit card transaction which is routed by the Acquirer to the Issuer who has allocated that credit card number to the MPP.

210. If the POS terminal cannot be programmed or its firmware upgraded, the MPP sends the physical credit card assigned to that POS terminal to the merchant. This card is swiped at the POS terminal by the merchant for each mobile payment made by a consumer.

212. In either case, the MPP also sends to the merchant the short name, IP address and phone number to be displayed at the POS terminal. Mobile Payment is made by the consumer in one of the following ways:
   a. Connect to the IP address through a secure network protocol and submit a mobile device identifier and consumer PIN. The IP address is at the MPP who can therefore identify the merchant to whom payment is made, retrieve the Mobile Payment Account associated with the mobile payment device and await a request from the Issuer partner.
   b. Connect to the phone number by dialing, send a PIN and mobile device identifiers (e.g. cell phone ESN) as tones to the phone number. The cell phone number is received by Caller ID and is added to the identifier and PIN received by tones to authenticate the consumer. The MPP then retrieves the Mobile Payment Account for that cell phone. Since the phone number dialed represents payment to a particular merchant who will also swipe a credit card for that transaction, the MPP waits for that request to come in from that merchant.
   c. Submit the short name to the MPP, obtain the associated IP address and phone number for that short name and then connect to either.
   d. Submit the short name along with consumer authentication information such as consumer PIN to the MPP. The MPP retrieves the payment instrument record, and account balance for that cell phone, and since the short name identifies the merchant being paid to, the MPP waits for transaction details from its issuer partner, which will include item price and reference number, from that merchant. The MPP will then compare the price with the Mobile Payment Account balance, approve or decline the transaction, update its database tables and send an approval message with approval number to its Issuer partner. The Issuer can send the approve or decline message to the merchant.

e. Submit either the IP address or phone number to the MPP along with authentication information as opposed to connecting to either of these merchant identifiers.

Connecting to an IP address or phone number instead of submitting either to the MPP is a more scalable solution. Any of the merchant IDs can be distributed and does not have to be processed by a single server.

214. The merchant is registered and can now accept mobile payments. The merchant can either swipe a credit card or hit key strokes which initiate transmission of assigned credit card information to the issuer. FIG. 2.1 described below shows the processes used to test successful registration by the Merchant for Mobile Payment processing.

Consumer with Mobile Phone: Pre-transaction Requirements.

300. The consumer needs to first "load" his mobile phone with cash by paying the MPP or its agent the load amount. Loading means that the mobile phone is linked to real money in an account at the MPP. The account is called the Mobile Payment Account for that mobile phone number and is debited for all mobile payments and credited for all mobile credits. Loading requires that the consumer fund the account with cash and also provide personally identifiable information (PII) such as name, address, zip code, phone number, phone type, phone carrier. The consumer is also prompted to select a PIN which will be used for all mobile payments.

302. Once payment is made or a credit line established, the MPP creates a database record that holds the mobile device identifiers, dollar balance, payment details and is linked to the mobile phone. This record called the Mobile Payment Account is exactly like a bank account and has a unique account number and dollar balance. It is linked to at least two identifies unique to that mobile device. For a cell phone this would be the cell phone number and its Electronic Serial Number (ESN) or International Mobile Equipment Indicator (IMEI). For a tablet, this could be the MAC address of the tablet with its Electronic Serial Number. A client digital certificate which is downloaded to the mobile device with the Mobile Payment Application (MoPA) may also serve as a unique identifier. These identifiers are used for authentication during a mobile payment when the mobile payment device connects to the Merchant Mobile Payment ID at the MPP. Connection and authentication details are given in the section titled "Technical Implementation Details".

If the Bank Credit Card Issuer and the MPP are the same, the mobile phone can be linked to a pre-existing checking or savings account, which is debited for each mobile payment. The process of loading a mobile phone with cash therefore involves a. Linking the cell phone number to a cash account or credit line belonging to the consumer. The cell phone number along with any unique identifier for that cell phone such as ESN number or client certificate from the MPP may be used for authentication during payment. Where payment is made by connecting to the merchant's phone number, the consumer does not have to transmit his cell phone number which is retrieved by Caller ID. The consumer only needs to transmit using DTMF tones his authentication information such as his PIN with a unique cell phone identifier such as the ESN. Once authenticated, the MPP uses the cell phone number to retrieve the Mobile Payment Account linked to that cell phone.

b. The MPP holds the account to which the consumer's mobile phone is linked. The balance in this account is debited for the consumer's purchases and credited for returns or any credit transaction such as reloading. An embodiment in which a credit card, debit card or similar payment instrument number is used as the Mobile Payment Account are described in detail below.

304. Once an account is created, linked to the mobile phone, the MPP downloads a mobile payment application (MoPA) to the consumer's mobile phone. MoPA can connect to the IP address or phone number or short name assigned to a merchant. MoPA can connect to a phone number either by dialing through the phone network or through a Voice over IP connection. It uses https on port 443 or SSL on the same port to connect to the merchant's IP Address. Both the IP address and the phone number assigned to the merchant reside on the MPP clearing server (MPPCS) which is a front end to an Asterisk server which serves as a PBX (Private Branch Exchange). All the phone numbers assigned to merchants are internal extensions of the Asterisk server. However Asterisk is configured so that these extensions can be reached through one main external phone number of the MPPCS. For example, if the MPP has a main number 212-444-1000 and assigns a phone number of 1234 to a merchant, then that merchant phone number can be reached by an external caller by dialing 212-444-1234.

The merchant short name, the IP address, and the phone number are stored as a single database record on the MPP database. When using the short name for payment, MoPA connects in one of two ways:

a. It submits the short name entered by the consumer along with the PIN, mobile device ID and item reference number directly to the MPPCS to which it connects by https.

b. It submits only the short name to the MPPCS. The MPPCS retrieves the short name from its database tables, identifies the IP address and phone number for that short name and returns both to MoPA on the mobile device. MoPA then connect to either the IP Address or phone number. This option is used where the merchant chooses to display only his short name and not all 3 MMPIDs.

The IP address and phone number, both reside with the MPP and are collective called the Merchant Mobile Payment IDs. The merchant displays these IDs at the POS terminal as well as a number (for example the aisle number) that uniquely identifies that POS terminal. For a mobile payment, the consumer's mobile payment application connects to either of these IDs, submits consumer authentication information such as a PIN, cell phone number, cell phone identifier and an identifier for the point-of-sale terminal at which the mobile payment is being made (e.g., an aisle number at a grocery store or a table number at a restaurant).

The consumer does not submit item or price data which makes mobile payments fast and efficient.

The consumer may also receive an MPP issued debit card if it also received an allocation of debit card numbers from the Issuer. (Bank Issuers can issue both credit card and debit card numbers with the same Bank Identification Number).

The MPP will link the debit card to the Mobile Payment Account of a mobile payment device. The effect is that the debit card like any ordinary debit card can be used to draw funds from the Mobile Payment Account linked to the Mobile phone and held at the MPP. The debit card is indistinguishable from ordinary bank debit cards backed by a bank account. Processing requests will always go first to the credit card issuer who will query the MPP to obtain approval or the account balance. In the latter case, the issuer using the balance can approve or decline payment.

306. MoPA performs authentication in connecting to the MPP. It can query the MPP; submit consumer's PIN and cell phone ESN or IMEI to the MPP using DTMF tones or a network protocol (e.g. https). It can allow the consumer to view payment history and can be installed with a client certificate that serves to uniquely identify the phone on which it is installed.

308. The merchant short name, IP address or phone number, constitute the Merchant Mobile Payment Identifiers, are displayed at the OPOS terminal, and used by the consumer to make mobile payments. The consumer enters his PIN and any one of the MMPID triplets into his MoPA to make a mobile payment to a merchant with an ordinary point of sale terminal.

310. Once the mobile phone is "loaded" and MoPA installed, the consumer is ready to make mobile payments.

Mobile Payment to Offline Merchant with Ordinary POS Terminal (Non-Wireless)

After pre-transaction requirements have been met by the merchant, consumer, credit card issuer and mobile payment processor, mobile payments can be used to pay for offline purchases. Before mobile payment is initiated, the merchant first rings up on his ordinary point of sale terminal (OPOS), the item or service to be paid for by the consumer. The merchant's mobile payment IDs—IP address, phone number and short name—any of which can be used for payment are displayed at the merchant's OPOS terminal. Once the product or service to be paid for is rung up at the OPOS terminal, mobile payment can begin. FIG. 3 is a diagram of the processes required for making mobile payments and the description below follows the process numbering in that Figure.

1. The consumer opts to make a mobile payment. He starts his Mobile Payment Application (MoPA), enters his PIN, a number identifying the OPOS terminal (e.g., the aisle number of the terminal) and chooses one of the Merchant's Mobile Payment IDs to connect to (for example the IP address). All MMPIDs reside with the Mobile Payment Processor and are fields in the database record for that particular merchant in the MPP's database. MoPA connects to the IP address and sends a. The consumer's PIN. This is used for authentication.
b. The OPOS terminal identifier. The POS terminal ID is lengthy and since the merchant provided the aisle number for each POS terminal during registration, the aisle number serves as the OPOS terminal ID although a different numeric identifier can be used. The OPOS terminal aisle number is all that is needed when the mobile payment is being made in-person at the terminal. The reason is that in person, the OPOS terminal processes transactions one at a time serially, akin to making payment at a grocery store checkout. This means at any time the OPOS terminal has one transaction pending approval for the consumer making that purchase. So specifying the particular terminal aisle implicitly specifies the transaction being processed on that terminal. In addition, the consumer will also be able to confirm either on the POS terminal or on his cell phone that the transaction for which he is making a mobile payment is the correct one before payment is processed. If mobile payment is being made remotely (for example for a purchase from an online merchant), the consumer would enter the item reference number for that item which is generated by the online merchant. This would be used in place of the POS terminal aisle number.
c. The unique identifier for the mobile device. For a cell phone this would be the phone number and its electronic serial number (ESN). For other mobile devices it can be a combination of MAC address and CPU number, or any combination of identifiers unique to that device.

MoPA uses different methods to connect to and send this information to any one of the merchant's MMPID—IP address, phone number, or short name.
  i. MoPA connects to the IP address assigned to the merchant at the MPP using a network protocol, such as https over SSL, provided the mobile device being used for payment has internet access. MoPA also sends the consumer's PIN, cell phone number, POS terminal ID (e.g. aisle number) and a unique phone identifier such as the cell phone's electronic serial number (ESN).
  ii. MoPA may instead dial the phone number assigned to the merchant and submit his PIN, the OPOS terminal aisle number, and unique phone identifier using DTMF tones. The cell phone number need not be sent separately as the Mobile Payment Processor (MPP) gets this via Caller-ID. MoPA may use fast tone encoders, such as Genave encoders which can send DTMF tones at the rate of 40 characters per second.
  iii. MoPA can send the short name directly to the MPP which can identify the merchant owner of the short name and continue processing. It can also send the short name and receive the IP address and phone number of that short name and then connect to one of them using the previously described methods. This process is called short name resolution. It has the advantage that it supports scalability as processing for an IP address or phone number can be delegated to different servers or to a third party processor. It also means that the merchant can show his short name alone and not include IP address or phone number.

2. The MPP receives the consumer's PIN, mobile device identifier, and POS terminal ID.

a. From the MMPID to which the data was submitted, it identifies the merchant to whom the mobile payment is to be made.
b. With the PIN it authenticates the consumer and from the mobile device identifier (e.g., phone number and phone ESN), it identifies the mobile device. It then retrieves the Mobile Payment Account linked to that mobile device and gets its dollar balance.
c. It then awaits a request from the credit card Issuer who is a partner of the MPP. This request comes from the merchant who once the consumer opts to make a mobile payment, swipes the credit card provided by the MPP or enters the key strokes on his OPOS that transmit the same credit card number to the Acquirer. So credit card and transaction data are routed through the Acquirer to the credit card issuer just as for a regular credit card transaction.
d. Once MPP retrieves the cell phone Mobile Payment Account balance, it sends a message back to the consumer asking that the consumer confirm the transaction on the merchant's OPOS terminal. This request for confirmation is only sent for OPOS terminals that require consumer confirmation before processing. The merchant would have provided his terminal type to the MPP during registration.
3. The consumer receives the message on his mobile phone through his Mobile Payment Application requesting he confirm his transaction on the merchant's OPOS terminal. He confirms the transaction amount on the OPOS terminal and is usually prompted to also select a cash back amount. If he does, the amount for which approval is requested would be the sum of the item purchased and the cash back amount.
4. The merchant OPOS terminal then sends to the Acquirer all the transaction information comprised of
a. Credit Card number (swiped by merchant or sent by the program installed on the OPOS terminal)
b. Dollar Amount (item price+cash withdrawal)
c. Item reference number
d. Item price
e. POS terminal ID
f. Merchant ID
g. Date and Time
5. The Acquirer identifies the credit card issuer by extracting the Bank Identification Number (BIN) from the credit card number it receives. It then sends to the Issuer all the transaction information received from the merchant and includes his own Acquirer identification number which identifies the Acquirer to the Issuer.
6. The credit card issuer using the information received from the Acquirer attempts to retrieve the account information for that credit card. This would be information that would be normally used to approve or decline a transaction such as credit card expiry date, zip code, address, dollar balance, name of account holder, and CVV. The issuer sees that it does not have an account record since this is the credit card allocated to the MPP. So it makes a call to the MPP to retrieve the account information needed to authorize or decline the transaction. The call can be an API call across the network to the MPP where the issuer submits all the information received from the merchant and receives approval or denial of the transaction request. Communication between the credit card issuer and the MPP can use connection pooling so that authentication is performed once and the sessions can be re-used to speed transaction processing. Each call from the credit issuer to the MPP will either return the balance for the Mobile Payment Account of the mobile device with which payment is made or return approval or transaction denial by the MPP. It will not return information on the credit card account since that credit card is assigned to the OPOS terminal of a merchant and is no longer the payment instrument.
7. The MPP receives from the credit card issuer data sent by the merchant which includes
a. The credit card number
b. The merchant ID
c. The item reference number
d. The item price
e. The POS terminal ID From the consumers mobile device the MPP also receives
i. The consumers PIN
ii. The mobile payment device identifiers (e.g., cell phone number and cell phone ESN)
iii. The POS terminal reference number (e.g., the aisle number of the POS terminal).

Using the consumer PIN and mobile payment device ids it authenticates the mobile device. This is two-factor authentication and the transmission from the mobile payment device to the MMPID can be encrypted by MoPA for dialed phone transmissions. Where the transmission is over the internet the encryption protocol is https over SSL. The MPP will have a public key used for initiating the SSL handshake for each incoming mobile request. After the mobile device is authenticated, the Mobile Payment Account for that mobile device is retrieved. Retrieval is performed via a SQL query which uses the mobile device IDs as composite key. From the MMPID the consumer connected to, the MPP identifies the merchant to whom payment is being made and from the aisle number it identifies the OPOS terminal ID at which payment was made. It then matches the merchant ID, OPOS terminal ID received from the consumer with the merchant ID, OPOS terminal ID received from the issuer. A match confirms that payment is being made by the specific mobile device to that merchant and item price and item reference number from the merchant are then used in approval or transaction denial. Matching is performed by doing a join on the merchant ID for tables holding Issuer information and mobile device input data.

iv. If the consumer confirmed payment at the OPOS terminal, then the MPP subtracts the item price from the Mobile Payment Account, credits the Merchant Revenue account and sends back to the issuer approval with approval number, item reference, item price, OPOS terminal ID, merchant ID and mobile payment device identifier (e.g. cell phone number).
v. If the OPOS terminal does not support consumer confirmation, then the MPP sends to MoPA on the consumer's payment device, the item reference number, price, merchant, date and time and requests confirmation. After the consumer confirms, then approval is sent back to the MPP, which then performs a debit of the Mobile Payment Account and then sends approval or denial message to the issuer along with the transaction data. If the consumer declines confirmation, then the transaction is declined also by the MPP and the decline message is sent to the issuer.
8. The Issuer sends approval or denial in its usual format to the merchant through the Acquirer.

9. The Acquirer forwards the approval or denial to the merchant. It keeps a record of each transaction for latter settlement with the merchant.
10. The merchant receives approval for the transaction with an approval number. His OPOS terminal prints a receipt as usual that contains transaction information namely: approval number, item reference number, item price, merchant ID, date and time. The mobile payment transaction has been completed with no change to the merchant's point of sale terminal, processing network or infrastructure.

If the merchant had multiple terminals they could all process mobile transactions with the same credit card number provided by the MPP. However, this would slow simultaneous processing of transactions and may create fraud alerts as the same credit card will be processed simultaneously from different terminals. A different card should therefore be used with each POS terminal.

Where confirmation is performed at the merchant's POS terminal, the merchant can swipe the credit card even before the consumer initiates payment, since transaction information is not sent to the Acquirer until the consumer confirms the transaction on the OPOS terminal. The consumer confirms only after connect with his mobile phone to the merchant to the merchant mobile payment ID.

Draw Cash from ATM

Using a Debit Card linked to his MPP account the consumer is able to draw cash from an ATM. The consumer can also make a debit card purchase. Referring to FIG. 6:

1. The consumer receives a debit card from the Mobile Payment Processor (MPP). The debit card can either be issued by the MPP, if it has a Bank Information number (BIN) or it can be assigned to the MPP by a Bank debit card Issuer. The consumer must select a PIN for the debit card before use.
2. The consumer uses the debit card at an ATM to withdraw his phone funds held in his account at the MPP. When the card is used at an ATM, the debit card number is read from the magnetic stripe, and along with the withdrawal amount requested, is routed to the bank card issuer through a processor gateway within the ATM network.
3. The processor gateway on the debit card network is the equivalent of an acquirer for a purchase transaction. The processor gateway identifies the card issuer from the debit card number and forwards the transaction data to it.
4. The issuing bank receives the transaction data which includes, the debit card number, PIN, ATM ID, cash withdrawal amount, date, and time. It tries to retrieve the card information from its records and recognizes it is assigned to the MPP.
5. It queries the MPP to get balance information and to authorize the debit card transaction. The MPP uses the debit card number to retrieve the MPP account to which it is linked. It checks that the balance covers the transaction, which in this case is a cash withdrawal. If so, it debits the consumer's MPP account for the transaction amount, notes the transaction details with the new account balance in its records, and generates an approval number. If the balance is insufficient it denies the transaction and may generate a denial number.
6. It then returns transaction approval or denial to the debit card issuer.
7 The debit card issuer routes the transaction approval or denial received back to the processor gateway.
8. The processor gateway routes it back to the ATM instructing it to disburse the cash requested by the consumer or provide an account balance or decline the request.
9. The consumer receives cash from the ATM.

The debit card purchase is processed in exactly the same manner as an ATM cash withdrawal except that a merchant replaces the ATM and instead of disbursing cash, the merchant releases goods purchased and receives funds into his account as payment. Also cash withdrawal and PIN debit card transactions are generally carried on ATM networks, while credit card transactions are carried on credit card networks. In the embodiment described, the debit card is linked to the consumer's MPP account. This is different from the embodiment given in FIG. 8 where a debit card (or credit card) is loaded on a phone but is not linked to the consumers MPP account, but instead has an account at a different issuer. The MPP has to contact that issuer for authorization for any transactions.

In cases where the MPP is also the issuer of the debit card which is linked to the consumer's MPP account, both embodiments collapse into one. In addition, transactions will be routed to the MPP directly and there will be no intermediate issuing bank.

Mobile Payment to Online Merchant

To accept mobile payments online the merchant will need to first register with the Mobile Payment Processor. The following is performed during registration 1. The merchant is assigned merchant mobile payment IDs comprised of IP address, phone number and short name either of which the consumer enters into his mobile device to make payment.
2. The merchant downloads Vendor Mobile Processing Application from the MPP. This software provides an API to which the merchant's web server or application server submits transaction data. Submission of transaction data to this API is initiated when the consumer selects mobile payment as the payment option for example by clicking a "make mobile payment" radio button.

Figure 8:
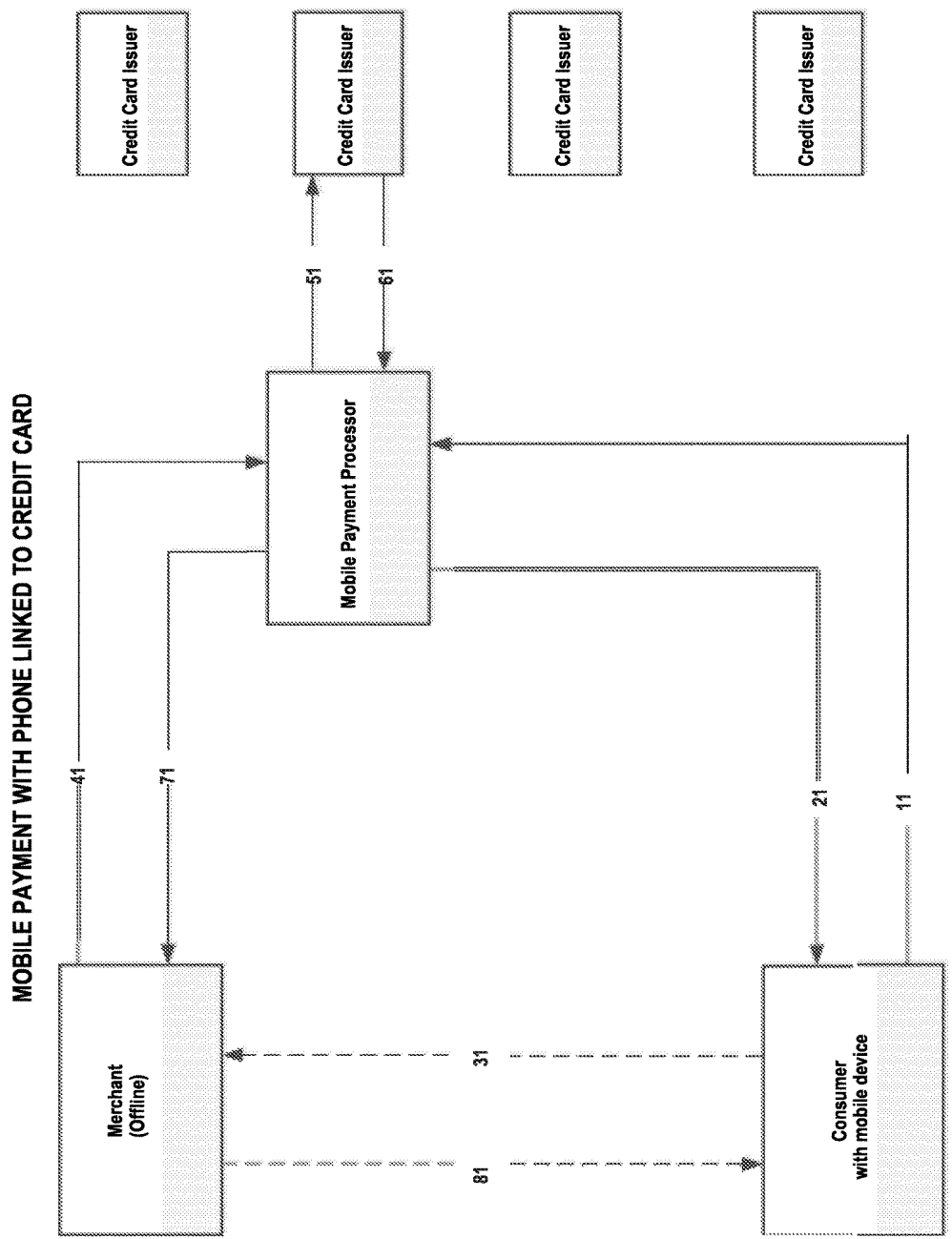
FIG. 8 is a block diagram demonstrating the steps necessary for a consumer to make a payment with a mobile device linked to a credit card to an off-line merchant.

For Online mobile payment the processes are illustrated in FIG. 8 and the process description below follow the numbering in that diagram.

10. On the merchants payment page, when the consumer selects "make mobile payment", the merchant submits to the API of the mobile application on his web server
   a. The item reference number
   b. The item price
   His web server also displays his merchant mobile payment IDs and item reference number for the item to be purchased. It displays a message directing the consumer to use the item reference number and his MMPID to make the mobile payment.
20. The Vendor Mobile Payment Application adds 2 more pieces of data to the item reference and item price: the merchant MMPIDs, and a number representing mobile payment (e.g., 9999999). It submits all 4 items to the MPP.
30. The consumer enters his PIN, the item reference number (generated and displayed by the online merchant) and either the merchants IP address, phone number or short name (also displayed by the online merchant) into MoPA on his payment device. MoPA connects to and transmits this information to either the IP address or phone number displayed by the merchant.
40. The MPP receives transaction data from both the online merchant and the mobile device. It authenticates the mobile device using the consumer's PIN and the mobile device identifiers and then retrieves the Mobile Payment Account for that device. Data from the merchant and from the consumer's mobile device are held in temporary relational database tables. The MPP does the following:

a. It does a SQL join on both tables and selects on item reference number and the mobile payment device id. For example select * from merchant input table and mobile device input table where item reference number='the item reference number received' and 'mobile device payment id='mobile device id just received'
b. The query output includes the item reference number, item price, merchant ID, date and time.
c. It sends this output to MoPA on the consumer's payment device and requests confirmation.
50. The consumer confirms the transaction amount and MoPA sends the information confirmation to the MPP.
60. If the consumer confirms the transaction
  a. The MPP then subtracts the item price from the Mobile Payment account for that mobile device. The MPP then sends approval with an approval number, item reference, item price, date and time to the merchant.
  b. If the consumer declines the confirmation, the transaction is declined and the MPP sends a declined message and number, with the item reference number date and time to the merchant
70. For approved transactions the MPP sends to the consumer's mobile device an approval message and approval number, item reference, item price, merchant ID, and Mobile Payment Account balance.
80. The merchant receives approval confirmation and then delivers the service or releases the product purchased. The transaction is complete. The merchant may need to obtain additional information for delivering the item or service paid for. This may include shipping address or other personal information. MoPA can be configured to authorize the MPP to transmit the consumer's address and any designated PII data to the merchant.

Mobile Payment for a Purchase from a Catalog

For remote purchases from a catalog, all items with their price and reference number are submitted beforehand to the MPP by the catalog vendor. This can be in form of a comma delimited ASCII file, where each record has an item reference number, item price, brief item description, and MMPIDs of selling merchant. When the consumer makes a mobile payment for a catalog purchase, he enters the item reference number from the catalog and one of the MMPIDs of the merchant. The MPP receives the mobile payment data and using the item reference retrieves the item details now loaded in the database from the file submitted earlier by the catalog vendor. The MPP sends back to the consumer's mobile device, the item reference price and item price for confirmation. Once the consumer confirms the purchase, the MPP retrieves the Mobile Payment Account linked to that mobile payment device. It approves the transaction if the consumer's account balance covers it. It then sends confirmation both to the consumer and to the merchant. Confirmation to the merchant can be by text, mms or email to an address specified by the catalog vendor during registration.

Mobile Payment with a Device "Loaded" with a Credit Card or Similar Payment Instrument.

The mobile device used for payment need not be linked to a Mobile Payment Account at the MPP instead it can store and transmit a credit card number (or a debit card number and PIN). This is received by the issuer and processed like a regular transaction. The mobile payment device need not have a special chip to hold the credit card number information, nor does the merchant need a special point of sale terminal (SPOS) to process the mobile payment.

Pre-Transaction Requirements

1. The Mobile Payment Processor is a card issuer who has a BIN or IIN. This is that part of the credit card number that identifies the credit card issuer. Having a BIN mean that credit cards issued by the Mobile Payment Processor when used for purchases will be routed to it by any acquirer for transaction approval.
2. The merchant who wishes to accept mobile payments registers with the Mobile Payment Processor and provides merchant information including specific data needed for mobile processing, namely:
  a. Merchant ID (assigned by acquirer)
  b. OPOS terminal ID (assigned by manufacturer)
  c. OPOS terminal aisle (provided by merchant)
  d. OPOS terminal type
  He receives a credit card from the MPP which is to be swiped through his OPOS terminal for each mobile payment. He displays at the OPOS terminal the MMPIDs that can be used for mobile payment as well as the aisle number for each OPOS terminal registered with the MPP for mobile payment processing.
3. Consumer registers with the MPP and provides the following
  a. His cell phone number or mobile device MAC address
  b. His cell phone or mobile device ESN
  c. The credit card number, with name, address, expiration, and CVV which will be linked to, and used as the Mobile Payment Account for the cell phone.
  d. The consumer also selects a PIN
4. The MPP creates records in its database tables for merchant and consumer registration (see description below in the section titled Technical Implementation Details).

Mobile Payment with Phone Linked to Credit Card

A mobile phone linked to a credit card can be used to make payment both at an offline and at an online (internet) merchant. The illustrative embodiment given below is for payment to an offline merchant with an OPOS terminal (non-wireless) and is illustrated in FIG. 8. The description below uses the process numbering in that diagram.

Before payment can begin the offline merchant rings up the item to be paid for by the consumer using his cell phone. The consumer opts to make mobile payment. The merchant swipes through his OPOS terminal the credit card received from the MPP for mobile payment processing.

11. The consumer connects to the IP address of the merchant to make a mobile payment for the item rung up. He enters into the MoPA application on his phone, his PIN and the aisle number of the OPOS terminal if in he is in a grocery store. If he is in a restaurant he would enter a table number and online he would enter a transaction reference number. At any place, for a mobile payment, he would enter a number that uniquely identifies the transaction being paid for.
21. The MPP authenticates the consumer using his PIN, his cell phone number and cell phone ESN. The MPP then attempts to retrieve from its database tables the Mobile Payment Account associated with the cell phone used for payment and sees that the account is a credit card account. It extracts the BIN of the credit card issuer and readies to send transaction data to that issuer on receiving transaction information from the merchant. It sends back a request to the consumer to confirm the transaction on the merchant's OPOS terminal.

3 1. The transaction details including item price are displayed on the merchant's OPOS terminal. The consumer confirms his transaction by selecting "YES" on the OPOS terminal display screen.
4 1. The merchant OPOS terminal then sends to the MPP
   a. Credit card number received from the MPP and swiped for this transaction
   b. The item price
   c. Item reference number
   d. OPOS terminal ID
   e. OPOS terminal aisle number
   f. Merchant ID
   g. Date and Time
5 1. The MPP using the OPOS terminal aisle number and merchant ID matches the transaction to the cell phone number linked to the credit card being used for payment. Matching is performed by viewing the queue of mobile device requests received for that particular merchant. Since the consumer's mobile phone connects to the address for that particular merchant, the MPP on receiving a request from a merchant, which will have the merchant's ID and OPOS terminal ID, can match the merchant ID to the IP address that the mobile phone connected to and can match the OPOS terminal aisle to the OPOS terminal ID through which the merchant swiped the MPP credit card. Technically this matching is accomplished as described below in the section titled "Technical Implementation Details". The merchant had earlier extracted the credit card account and BIN of the credit card issuer. So it sends the transaction data received from the merchant along with the credit card information linked to the cell phone to the Card issuer. The data sent are:
   a. Credit Card number (linked to the cell phone)
   b. Credit card account information (first name, last name, address, expiry, CVVV)
   c. Item price
   d. Item reference number
   e. Merchant ID
   f. OPOS terminal ID
   g. Mobile Payment Processor ID
   h. Date and Time
   This is exactly the information the credit card issuer would obtain from an Acquirer in order to approve or decline a credit card transaction.
6 1. The credit card issuer receives the request from the MPP, retrieves the credit card account records and matches it with the credit data received. If all data match and the credit card has not expired it determines if the credit card has enough credit balance to cover the item price. If it does, it approves the transaction if not it declines it. It then sends to the MPP
   a. An approved or Declined message with an associated number
   b. The item price
   c. The item reference
   d. The POS terminal ID
   e. The merchant ID
   f. The date and time.
7 1. The MPP forwards this approval request both to the merchant and to the MoPA on the consumer's cell phone.
8 1. The merchant can then release the item purchased to the consumer.

Technical Implementation Details

Registration is required for each consumer and merchant before they can engage in mobile payment transactions. Registration requires that the MPP create records in its database tables containing all the information provided by the consumer, or merchant. In this embodiment, the database is relational and the tables are normalized. The data received is therefore not entered into a single table.

1. Consumer Registration: The consumer in order to be able to perform Mobile Payments has to link his cell phone to a Mobile Payment Account which he has funded with cash. This requires that the consumer pay cash to the MPP or its agent and provide personally identifiable information (PII) such as first name, last name, address, zip code, sex, etc., as well as information specifically required for mobile payment authentication and processing. This is data that uniquely identifies the cell phone as well as the consumer's PIN namely:
   a. Cell phone number
   b. Cell phone ESN
   c. Cell phone IMEI
   d. PIN The MPP creates the following consumer database tables with the following data:

Table 1 holds PII data

Table 2 holds the mobile device data and consumer PIN. Each record may also contain a client certificate which is included in the Mobile Payment Application (MoPA) downloaded from the MPP and installed on the cell phone. The client certificate also serves to uniquely identify the cell phone. The unique cell phone identifiers along with the consumers PIN are used in 2 factor authentication Table 3 contains the Mobile Payment Account Number which is the record of the monies linked to the cell phone. That record in the database will have fields required for secure payment processing:
   e. Dollar balance
   f. Cell phone number
   g. Cell phone ESN
   h. Cell phone IMEI
   i. Cell phone client Certificate
   j. Mobile Payment Account Number It may have additional fields such as Payment dates, loading dates, Payment recipients, loading locations, currency type etc. The Mobile Payment Account is like a bank account that shows credits and debits but in addition contains information that uniquely identifies the mobile payment devices. After the MPP authenticates a cell phone using data in Table 2, it retrieves the Mobile Payment Account for the cell phone by doing a join on Table 2 and Table 3 on cell phone number and ESN. A SQL query that can accomplish this from the tables created would be Select Dollar Balance from Table 3, Table 2 where Table3.Cell phone number=Table2.Cell phone number AND Table3.cell phone ESN=Table2.cell phone ESN.
This would output the balance for the Mobile Payment Account for that cell phone.

2. Merchant Registration: Merchant registration to accept mobile payments assumes that the merchant is already set up to process credit card transactions, has a point of sale terminal, a merchant ID, and an Acquirer. Registration requires that the merchant provide general information such as merchant name, address, zip code, type of business, phone number, fax number etc. This general merchant information is held in tables in the MPP's databases. The merchant also provides information which will be required for Mobile Payment processing namely:
   a. Merchant Name (Business Name)
   b. Merchant ID (Assigned by his Credit Card Acquirer)
   c. POS Terminal ID (Assigned by the POS manufacturer)
   d. POS Terminal Model, and manufacturer and Type.

i. Whether it provides consumer confirmation
ii. Whether its firmware can be remotely uploaded
iii. If it has memory locations for running local programs
e. Lane Number or Aisle Number of POS terminal. This would be '1' if the merchant has only one terminal. If the merchant has multiple terminals he will provide POS Terminal ID and model for each as well as the aisle number.
f. Preferred short name The MPP either sends the merchant a credit card to be swiped by the merchant at this terminal for each mobile payment transaction or he provides the merchant with a firmware update or loadable program which sends the credit card number on hitting designated key strokes as if the card was physically swiped at the terminal. He also assigns an IP address, and a phone number which with the short name selected by the merchant comprise the Merchant Mobile Payment Identifiers (MMPID). The cell phone or mobile device connects to either one of these identifiers to make a payment. Information provided by the merchant as well as information assigned by the MPP are then placed in the following tables. (The table numbering is arbitrary and only illustrative).

Table 20 holds general merchant information
Table 21 holds a revenue account to which mobile payments are credited. It has the following fields:
g. Merchant ID (Assigned by Credit Card Acquirer)
h. POS Terminal 1 Credit Card Number (Assigned by the MPP)
i. POS Terminal 1 ID
j. POS Terminal 2 Credit Card Number (Assigned by the MPP)
k. POS Terminal 2 ID Table 22 holds merchant processing information and includes data assigned to the merchant by the MPP
l. Merchant ID
m. IP Address
n. Phone Number
o. Short Name
p. POS Terminal 1 ID
q. POS Terminal 1 aisle number
r. POS Terminal 2 ID
s. POS Terminal 2 aisle number
t. POS Terminal n ID
u. POS Terminal n aisle number Table 23 holds revenues for each POS Terminal. It has the following fields
v. POS Terminal 1 ID
w. Item reference number
x. Item price
y. Mobile Payment Device number
z. Date and Time.

The total revenue received from all POS terminals can be determined by running an aggregate select query such as 'Select sum(Mobile Payment Amount) from Table 23'

3. Mobile Payment Processing: To process a Mobile Payment, the MPP receives data from both the consumer's mobile payment device and the OPOS terminal of the merchant. It holds the data received from merchant and consumer in temporary database tables it performs the following steps to process the transaction:
4. Matching: The MPP matches the transactions to ensure that the mobile device is paying at the OPOS terminal of the correct merchant. Since the mobile device does not contact the merchant directly this matching is essential.

Matching is performed as follows:
a. Following mobile device authentication described below, the MPP has a record in temporary tables for the mobile payment data received from the consumer namely:
i. merchant IP address or phone number or short name,
ii. cell phone number,
iii. cell phone ESN,
iv. POS terminal aisle number or item reference number.

It runs a query to retrieve the Mobile Account Number associated with the Mobile Device and its balance. The query would join the temporary consumer table with the Table 3 and select on Mobile Account Number and dollar balance.
b. The MPP also has a record in temporary tables for payment instrument and transaction data sent by the merchant and received from the Credit Card Issuer namely:
i. Credit card number (provided by the MPP)
ii. POS Terminal ID
iii. Merchant ID
iv. Item reference number
v. Item Price
vi. Date and Time To ensure that that payment is being made to this merchant with the cell phone, the MPP joins the two temporary tables and Table 22 in a select query and selects on POS Terminal aisle number and IP address. e.g.

Select Merchant ID, cell phone number from consumer temporary table, merchant temporary table, Table 22
where consumer temporary table.POS Terminal aisle number=Table 22.POS Terminal aisle number AND
consumer temporary table.IP address=Table 22.IP address.

The query returns the cell phone number and the merchant ID paid to.
c. The MPP can then debit the Mobile Payment Account for the Mobile device, credit the Revenue Account of the POS Terminal and send approval confirmation to the Credit Card Issuer.

5. Connection and authentication for all MPP client applications. On registration, the consumer downloads a client application on his cell phone or mobile device, the Mobile Payment Application (MoPA) used to transmit data securely to the MPP. This application needs to connect securely to the IP address assigned to the merchant or securely transfer authentication data by phone using DTMF tones. Data connection to an IP address is performed securely using https on port 443. The MPP clearing server has a public key so connecting to the IP Address assigned to the merchant to submit data uses SSL as the underlying protocol. The MoPA application initiates the communication which runs on the cellular IP network into the WAN of the MPP. The IP address assigned to the merchant is a public or routable address. Both IP addresses and phone numbers are assigned by an Asterisk server running within the MPP clearing server.

What is claimed is:
1. A method to establish an association among a consumer, a merchant, and a mobile payment provider (MPP) over a network, comprising the steps:
the merchant registering with the MPP by submitting merchant information;

the merchant submitting to the MPP mobile payment processing information;

a credit card issuer allocating at least one credit card account having a credit card number to the MPP;

the MPP assigning the credit card number to an ordinary point of sale terminal (OPOS terminal) of the merchant over the network;

the MPP assisting the merchant to allow the OPOS terminal to process the credit card number over the network;

the MPP assigning three mobile processing identifiers to the merchant, the three mobile processing identifiers being an IP address, a phone number, and a short name associated with the merchant;

the consumer setting up a mobile payment account with the MPP;

the consumer providing personal identification information to the MPP;

the consumer funding the mobile payment account;

the MPP creating database records for the merchant information and the mobile payment account;

the MPP downloading a mobile payment application (MoPA) to a mobile device of the consumer;

the MPP facilitates mobile purchasing over the network by connecting the MoPA on the mobile phone of the consumer to the OPOS terminal of the merchant via the three mobile processing identifiers assigned to the merchant, wherein the short name is associated with the IP address and the phone number in that when the consumer submits the short name to the MPP, the MPP returns the IP address and the phone number, wherein the MPP sends to the MoPA on the consumer's mobile payment device, an item reference number, a price, a merchant, a date and time, and requests confirmation, and the consumer sends an approval from the mobile payment device using the MoPA.

2. The method of claim 1, wherein the MPP assists the merchant to allow the OPOS terminal to process the credit card number by sending a credit card bearing the credit number to the merchant.

3. The method of claim 1, wherein the MPP assists the merchant to allow the OPOS terminal to process the credit card number by providing a software to run on the OPOS terminal.

4. The method of claim 1, wherein the MPP assists the merchant to allow the OPOS terminal to process the credit card number by upgrading a POS terminal firmware running on the OPOS terminal.

5. The method of claim 4, wherein the MPP upgrade the POS terminal firmware by downloading an executable program which contains the credit card number to the OPOS terminal.

6. The method of claim 1, wherein the merchant information comprises: a name, an address, and an standard industrial classification (SIC) code.

7. The method of claim 1, wherein the mobile payment processing information comprises: a. a merchant ID assigned to the merchant by the acquirer, b. a POS terminal ID, c. a POS terminal type, and d. a preferred merchant short name.

8. The method of claim 1, wherein the IP address, the phone number, and the short name are displayed by the OPOS terminal.

9. The method of claim 1, wherein the personally identifiable information includes a consumer name, a consumer address, and a consumer phone number.

10. The method of claim 1, further comprising: the consumer selecting a personal identification number (PIN) when setting up the mobile payment account.

11. The method of claim 1, further comprising: the mobile payment account is linked to a bank account or credit line belonging to the consumer.

12. The method of claim 1, further comprising: the mobile payment account is linked to a unique identifier of a mobile device the consumer uses.

13. The method of claim 12, wherein: the unique identifier is a cell phone number, a electronic serial number, or an international mobile equipment indicator.

* * * * *